Jan. 27, 1970 E. V. FUDIM 3,491,944

PULSATING LINEAR PNEUMATIC RESISTANCE ELEMENT

Filed Jan. 12, 1968 3 Sheets-Sheet 1

PULSATING LINEAR PNEUMATIC RESISTANCE ELEMENT

Filed Jan. 12, 1968 3 Sheets-Sheet 3

United States Patent Office 3,491,944
Patented Jan. 27, 1970

3,491,944
PULSATING LINEAR PNEUMATIC RESISTANCE ELEMENT

Efrem Vladimirovich Fudim, Moscow, U.S.S.R., assignor to Institute Avtomatiki I Telemekhaniki, Kalanchevskaja, Moscow, U.S.S.R.

Continuation-in-part of application Ser. No. 411,992, Nov. 18, 1964. This application Jan. 12, 1968, Ser. No. 697,531
Int. Cl. G06d *1/00;* G06m *1/12*
U.S. Cl. 235—200 6 Claims

ABSTRACT OF THE DISCLOSURE

An apparatus for transferring gas between an input and an output line. The amount of gas transferred is proportional to the pressure difference existent between the two lines and to the frequency of an input control signal. The apparatus comprises a chamber connected to each line through a valve, the valves being controlled by the input signal. A plurality of the basic units are interconnected in various ways to perform several mathematical functions, adding, multiplying, dividing, and generating logarithmic and exponential functions.

Other applications

This is a continuation-in-part of Ser. No. 411,992, filed Nov. 18, 1964 and now abandoned.

Detailed description

Figure 1:
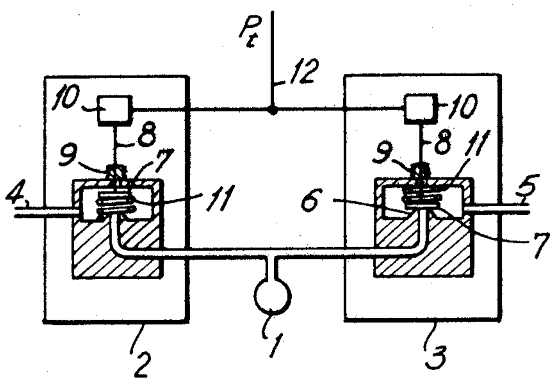
FIGURE 1 is a diagrammatic illustration of a pulsating linear pneumatic resistance-element.

The present invention relates to computing techniques, and more particularly to resistance-elements with pneumatic or mechanical drives for transferring gas used in pneumatic computers which perform linear and nonlinear mathematical operations on pneumatic analog signals and discrete signals of any type of energy.

Known pneumatic computers, employing the principle of compensation of forces or their moments, call for application of sensitive elements (membranes or bellows) and kinematic circuits, which restrict the accuracy of operations and bring about instability due to the time shift in responses of the sensitive elements. Such pneumatic computers are complicated in design and fail to provide sufficient accuracy.

Computers with known pneumatic resistance-elements and amplifiers have a very low accuracy because these pneumatic resistance-elements feature a nonlinear dependence of gas flow on pressure drop in the adopted working-pressure range of 3+15 p.s.i.

Also, the conductivity of known pneumatic resistance-elements cannot be regulated with sufficient accuracy in proportion to an alternating signal, and hence it has been impossible to make multiplying-dividing pneumatic devices with pneumatic resistance elements and amplifiers. That is why the problem of providing a linear pneumatic resistance-element is of importance.

An object of the present invention is to provide a pneumatic resistance-element having a linear dependence of gas flow on pressure drop in its external commutation lines, thus making it feasible to manufacture precision pneumatic devices to perform linear mathematical operations.

Another object of this invention is to provide a pneumatic resistance-element the conductivity of which can be regulated with a high accuracy in proportion to an alternating signal, given in the form of frequency-modulated pulses, thus making it feasible to manufacture precision pneumatic devices performing a number of nonlinear mathematical operations.

A further object of the present invention is to provide a pneumatic resistance-element with respect to which the amount of gas passed through is in implicit relation to the time and in proportion to an alternating signal modulated by the number of pulses, thus making it feasible to manufacture precision pneumatic computers for performing both linear and a number of non-linear operations discretely in time, as well as a device integrating with regard to a variable, and devices functioning as differential-analyzers.

According to said objects of the invention, a pulsating linear pneumatic resistance-element lets gas through itself in portions and comprises a pneumatic chamber to be filled with gas from external commutation lines, two pneumatic valves joined in this chamber and intended to connect it in alternate order, with the external commutation lines, the state of each of said valves being determined by a control signal of the valve.

These valves can be controlled by a signal, not regulated during the calculation process, or by a control signal varying in frequency.

The pneumatic resistance-element according to the invention permits the gas flow to be made proportional to the pressure drop, as well as positively controlling the conductivity in proportion to an alternating signal.

An advantage to such pneumatic resistance-element is the feasibility of using the same to design computers without pressure-to-effort converters and kinematc circuits which makes it possible to achieve a high accuracy in performing mathematical operations.

The present invention will be clearly understood from the following description with reference to the accompanying drawings, wherein are shown an exemplary embodiment thereof and some of its applications that in no sense should be regarded as the only possible realization thereof.

The pulsating linear pneumatic resistance-element (FIG. 1) comprises a chamber 1, and joined to it a normally open pneumatic valve 2 and a normally closed pneumatic valve 3, said valves being intended to connect in alternate order said chamber with external commutation lines 4 and 5 where respective absolute pressures are $\overline{P}_1$ and $\overline{P}_2$. Values 2 and 3 are both closed in between the alternate opening of the respective valves.

Each of said valve accommodates a nozzle 6 and a shutter 7, rigidly fastened to a rod 8, passed through a gland 9 and a rod drive 10. The valves and drives are per se conventional as shown in Aizerman, New Developments in Pneumo-Hydroautomation, published in Russian in Moscow (1964), page 13, FIG. 14*a*, in which there are shown pneumatic valves (provided with drives), and FIG. 15 where two valves, namely a normally closed and a normally open one, have a common control signal $P_t$.

The state of the valves is determined by a valve control signal $P_t$ consisting of pulses (for instance, rectangular ones, the amplitude of which has two discrete levels) and acting on drives 10. When there is no pulse in the signal $P_t$, the valve 2 is open (the shutter 7 being in upper position, line 4 being connected to chamber 1) and the valve 3 is closed (the shutter 7 is in the lower position). When a pulse is sent, the valve 2 is closed (and line 4 is disconnected from chamber 1) and the valve 3 is opened (line 5 being connected to chamber 1). A spring 11 retains the valves in their normal state when there is no pulse in control signal $P_t$.

The control signal $P_t$ is coupled into the line 12.

Figure 2:
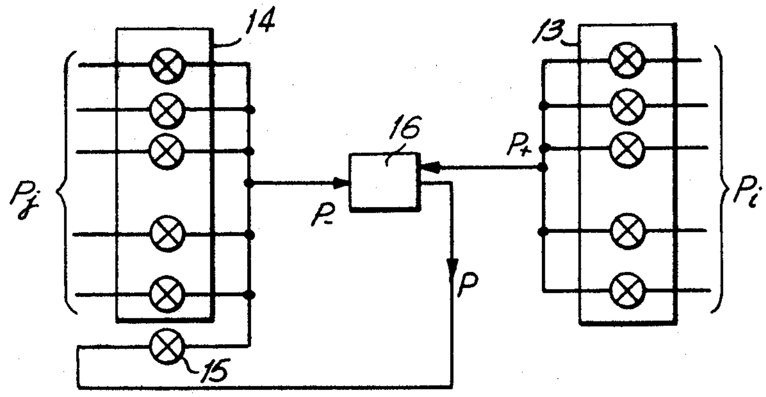
FIGURE 2 is a circuit diagram of an algebraic adder.

The algebraic-adder shown in FIG. 2 contains $n$ pulsating resistance-elements 13 with respective conductivities $\alpha_i$, the inputs of said resistance-elements being pressures $P_i (1 \leq i \leq n)$.

The flows come from resistance-elements 13 to a unit where they make up a total pressure of $P_+$. The device shown in FIG. 2 also contains $m$ pulsating resistance-elements 14 with respective conductivities $\alpha_j$, the inputs of said resistance-elements being pressures $P_j (1 \leq j \leq m)$, while the flows from resistance-elements 14 and a feedback resistance-element 15, with $\alpha_{m+1}$ conductivity and P input, come to the unit, and make up a total pressure $P_-$; and an amplifier 16 the output pressure P of which insures the equality of its input $P_- = P_+$.

Figure 3:
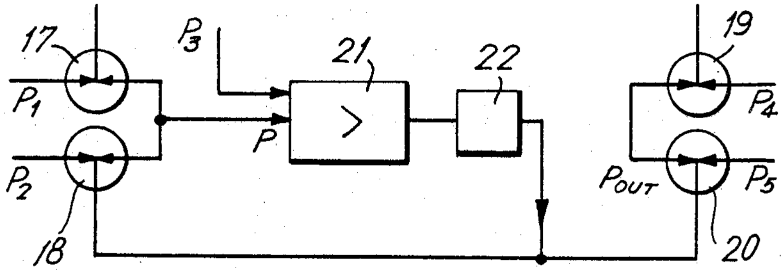
FIGURE 3 is a block diagram of a multiplying-dividing device.

The multiplying-dividing device, shown in FIG. 3, has five inputs to which pressures $P_1$, $P_2$, $P_3$, $P_4$ and $P_5$ are applied. The device is provided with two pairs of parallel connected pulsating resistance-elements 17 and 18 with respective conductivities $\alpha_1$ and $\alpha_2$ and resistance-elements 19 and 20 with respective conductivities $\alpha_3$ and $\alpha_4$. In addition, the device incorporates an amplifier 21 to the inputs of which the pressure P made up by resistance-elements 17 and 18, and the input pressure $P_3$ are applied; a converter 22 transforming the output pressure of the said amplifier 21 into a frequency-modulated signal which controls the conductivity of the resistance-elements 18 and 20.

The resistance-elements 17 and 19 are controlled by a frequency signal sent from a generator (not shown in the appended drawings).

The output pressure $P_{out}$ of the circuit is set up by the resistance-elements 19 and 20.

The aperiodic network circuit (FIG. 4) comprises a pulsating resistance-element 23, controlled by pulses $P_t$, and a chamber 24.

The chamber 24 has an initial pressure $P_c$, the working pressure in the chamber being P; the element 23 has an input pressure $P_6$.

The circuit of the device (FIG. 5) for the time-discrete performance of multiplying-dividing, exponential and logarithmic operations contains two aperiodic networks (a pulsating resistance-element 25 with a chamber 26 and a pulsating resistance-element 27 with a chamber 28), a pulse generator 29 controlling the resistance-elements 25 and 27, and an amplifier 30 which, by means of a valve 31, stops the entering of control pulses from the generator 29, when the pressure in the chamber 26 falls to the $P_2$ value. The valves 32 and 33 are intended for admitting the input pressures $P_1$ and $P_3$ into the device. The pressures $P_o'$ and $P_o''$ are the respective count levels of $P_1$ and $P_3$. The result of calculation is the pressure in the chamber 28 when the pressure in the chamber 26 reaches the $P_2$ value.

As is seen from FIG. 1, when there is no pulse in the signal $P_t$ the normally open valve 2 connects the chamber 1 with the line 4, where an absolute pressure of $\overline{P}_1$ is maintained; as to the amount of gas in the chamber, it is determined in accordance with the law of gas state by the expression:

$$G_0 = \frac{\overline{P}_1 \cdot V}{R \cdot \theta} \quad (1)$$

where $G_o$—amount of gas in chamber 1 in the absence of a pulse in signal $P_t$, V—volume of chamber 1,
R—gas constant,
$\theta$—absolute temperature.

A pulse in signal $P_t$ makes the chamber 1 disconnect from the line 4, and by means of the normally closed valve 3 connects with line 5 having an absolute pressure of $\overline{P}_2$.

The amount of gas in chamber 1 will be:

$$G_1 = \frac{\overline{P}_2 \cdot V}{R \cdot \theta} \quad (2)$$

Thus, the entering of one pulse in signal $P_t$ produces a $\Delta G$ change in the amount of gas contained in the chamber 1, that is an amount of gas (portion) equal to:

$$\Delta G = G_0 - G_1 = \frac{V}{R \cdot \theta} \cdot (\overline{P}_1 - \overline{P}_2) \quad (3)$$

passes from one commutation line in the other.

When the frequency of pulses $P_t$ is $f$, the gas flow $g$ per unit of time will be:

$$g = \frac{V \cdot f}{R \cdot \theta} (\overline{P}_1 - \overline{P}_2) = \alpha (\overline{P}_1 - \overline{P}_2) = \alpha (P_1 - P_2) \quad (4)$$

where $P_1$ and $P_2$=excessive pressures corresponding to absolute pressures $P_1$ and $P_2$, $$\alpha = \frac{V \cdot f}{R \cdot \theta} \quad (5)$$

conductivity of the pneumatic resistance-element.

Thus, the device shown in FIG. 1 is a pulsating linear pneumatic resistance-element where flow is in direct proportion to the pressure drop as far as the gas-state law goes. The gas is delivered through this resistance-element in portions at a frequency $f$ corresponding to that of the valves control signal $P_t$.

At a sufficiently high frequency it is possible to obtain continuous gas flow through this resistance-element with a required approximation.

As follows from the Equations 4 and 5, the conductivity of the resistance-element is in direct proportion to the frequency $f$ of the valve control signal $P_t$.

This very fact makes it feasible to provide both for a resistance-element with a constant conductivity, i.e., a conductivity not regulated during the calculation process (when the valves are controlled by a signal not regulated by frequency), and a resistance-element with a linearly controlled conductivity (when the valves are controlled by a signal varying in frequency).

The amount of gas passed through the resistance-element is in implicit relation to the time and in direct proportion to the number of pulses in the valve control signal, hence it is feasible to have an aperiodic network controlled by the number of pulses rather than by the time and to integrate with regard to a variable.

For those skilled in the art it will be clear that said pulsing resistance-element may serve as a basis for designing the following devices:

When the resistance-element conductivity is not regulated during the calculation process, linear pneumatic computers performing the operations continuously in time (algebraic adders with unlimited number of inputs, multipliers by a constant coefficient, integrators, differentiators);

When the resistance-element conductivity is regulated by a signal variable in frequency—multiplying-dividing pneumatic computers performing the operations continuously in time (solving proportions, multiplying and dividing two variables, square rooting, squaring and a number of derivative operations);

When the valves are controlled by a valve control signal modulated by the number of pulses and the resistance-element is functioning in the aperiodic network, devices performing a number of linear and nonlinear operations discretely in time (transforming the number of pulses into pressure and vice versa, multiplying, dividing, exponential, logarithmic operations, etc.) as well as operations involving integrating with regard to a variable, and on its basis, a very wide range of mathematical operations as effected by the methods of differential analyzers.

The examples given below as illustrations should by no means be understood as limitations to the present invention. It should also be understood that various modifications of the now preferred embodiment of the invention may be resorted to without departing from its spirit and scope.

Example 1

The present invention is employed in an algebraic adder (FIGURE 2); as the sum of gas flows coming to the unit is equal to zero there are realized the following relationships:

$$\sum_{i=1}^{n} \alpha_i (P_+ - P_i) = 0 \qquad (6)$$

$$\sum_{j=1}^{m} \alpha_j (P_- - P_j) + \alpha_{m+1} (P_- - P) = 0 \qquad (7)$$

The amplifier 16 develops an output pressure P; the latter, with the aid of a feed-back resistance-element 15, provides for the absence of a mismatch on its input, that is for the equality $P_- = P_+$.

The value $P_+$ may be determined from the Equation 6 and the value of $P_-$ from the Equation 7:

$$P_+ = \sum_{i=1}^{n} \frac{\alpha_i}{\sum_{i=1}^{n} \alpha_i} P_i \qquad (8)$$

$$P = \frac{\sum_{j=1}^{m} \alpha_j + \alpha_{m+1}}{\alpha_{m+1}} P_- - \sum_{j=1}^{m} \frac{\alpha_j}{\alpha_{m+1}} P_j \qquad (9)$$

By substituting the value of $P_+$ in the Equation 9 for the value of ($P_-$), the first taken from the Equation 8 there is obtained:

$$P = \frac{\sum_{j=1}^{m} \alpha_j + \alpha_{m+1}}{\alpha_{m+1}} \sum_{i=1}^{n} \frac{\alpha_i}{\sum_{i=1}^{n} \alpha_i} P_i - \sum_{j=1}^{m} \frac{\alpha_j}{\alpha_{m+1}} P_j =$$

$$\frac{\sum_{j=1}^{m} \alpha_j + \alpha_{m+1}}{\sum_{i=1}^{n} \alpha_i} \sum_{i=1}^{n} \frac{\alpha_i}{\alpha_{m+1}} P_i - \sum_{j=1}^{m} \frac{\alpha_j}{\alpha_{m+1}} P_j$$

When $$\frac{\sum_{j=1}^{m} \alpha_j + \alpha_{m+1}}{\sum_{i=1}^{n} \alpha_i} = 1$$

$$P = \sum_{i=1}^{n} \frac{\alpha_i}{\alpha_{m+1}} P_i - \sum_{j=1}^{m} \frac{\alpha_j}{\alpha_{m+1}} P_j$$

ducing by $1/R_-$ there obtained $$P = \sum_{i=1}^{n} \frac{V_i}{V_{m+1} \cdot f_{m+1}} f_i P_i - \sum_{j=1}^{m} \frac{V_j}{V_{m+1} \cdot f_{m+1}} f_j P_j$$

If $f_i = f_j = f_{-m+1}$, and $V_i$, $V_j$, $V_{m+1}$ are constant adjustable coefficients, the device is an algebraic adder of pressures, said adder having unlimited number of inputs, and adjustable coefficients with each addend.

If $P_i = P_j =$ const. and $f_{m+1} =$ const., the device is an algebraic adder of frequencies, said added having unlimited number of inputs, adjustable coefficients and an analogous output.

Example 2

The present invention is employed in a device performing a number of nonlinear mathematical operations.

The sum of gas flow (FIGURE 3) coming to the unit through the resistance-elements 17 and 18 is equal to zero; hence in accordance with the Equation 4

$$\alpha_1 (P - P_1) + \alpha_2 (P - P_2) = 0 \qquad (10)$$

Substituting the value $\alpha$ from the Equation 5, assuming for the sake of simplicity the volumes in resistance-elements 17 and 18 to be equal and making the necessary transformations:

$$f = -f_1 \cdot \frac{P - P_1}{P - P_2} \qquad (11)$$

where $f_1$ and $f$ = frequencies of the respective control signals to resistance-elements 17 and 18.

The output of the amplifier 21 enters the converter 22 which produces a signal with a frequency $f$, said signal controlling the conductivity of the resistance-element 18 in such a manner as to preclude a mismatch on the amplifier input, i.e. to provide an equality between P and $P_3$.

In this case the Equation II may be written as:

$$f = -f_1 \cdot \frac{P_3 - P_1}{P_3 - P_2} \qquad (12)$$

The sum of gas flows coming to the unit through the resistance-elements 19 and 20 is equal to zero. Using Equations 4 and 5 there are obtained the following relationships:

$$\frac{f_1 V_4}{R \cdot \theta} (P_{out} - P_4) + \frac{f \cdot V_5}{R \cdot \theta} (P_{out} - P_5) = 0$$

where $V_4$ and $V_5$ = respective volumes of resistance-elements 19 and 20.

Substituting value $f$ from the Equation 12 and multiplying by $R\theta$ when $V_4 = V_5$:

$$(P_{out} - P_4) - \frac{P_3 - P_1}{P_3 - P_2} (P_{out} - P_5) = 0$$

Now this equation can be transformed as follows:

$$(P_{out} - P_5) - (P_4 - P_5) \frac{(P_3 - P_2) - (P_1 - P_2)}{P_3 - P_2} (P_{out} - P_5) = 0$$

$$(P_4 - P_5)(P_3 - P_2) = (P_1 - P_2)(P_{out} - P_5)$$

$$(P_{out} - P_5) = (P_4 - P_5) \frac{P_3 - P_2}{P_1 - P_2}$$

$$P_{out} = P_5 + (P_4 - P_5) \frac{P_3 - P_2}{P_1 - P_2}$$

hence it is seen that the present device performs a multiplying-dividing operation on variables $P_4$, $P_3$ and $P_1$ with count levels of these pressures equal to $P_5$ and $P_2$.

If $P_5 = P_2 = 0$ then $$P_{out} = P_4 \cdot \frac{P_3}{P_1}$$

EXAMPLE 3

Figure 4:
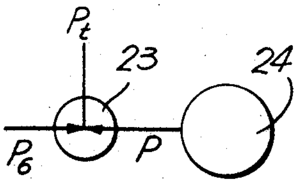
FIGURE 4 is a schematic view of an aperiodic network.

The present invention is employed in an aperiodic network (FIG. 4).

According to the law of gas state $$\frac{dP}{di} = \frac{R\theta}{V} \cdot \frac{dG}{di} \qquad (13)$$

where: $i$—number of pulses,
$dP/di$—pressure change in the chamber 24 per one pulse $P_t$,
$dG/di$—gas inflow in the chamber 24 per one pulse $P_t$,
V—volume of the chamber 24,
R—gas constant,
$\theta$—absolue temperature.

Using the Equation 3, with the input pressure $P_6$ and the resistance-element volume $V_1$ $$\frac{dG}{di} = \frac{V_1}{R\theta} (P_6 - P) \qquad (14)$$

Substituting 14 in 13

$$\frac{dP}{di}=\frac{V_1}{V}(P_6-P)$$

from which $$P=P_6+(P_0-P_6)e^{-\frac{i}{T}} \qquad (15)$$

where: $P_0$—initial pressure in the chamber 24 (with $i=0$), $T=\frac{V}{V_1}$ —time constant The exponent in the aperiodic network Equation 15 does not contain the time but the number of pulses $P_t$ supplied in the signal controlling the valves of the aperiodic network resistance-element, that is, the valves of this resistance-element are controlled by a signal modulated by the *i* number of pulses. This very fact makes it feasible to provide a device for integrating with regard to a variable, and on its basis to perform mathematical operations as differential analyzers (Shannon, C. E., Mathematical theory of the differential analyzer, I. Math. Phys., 20, N4, December 1941).

EXAMPLE 4

Figure 5:
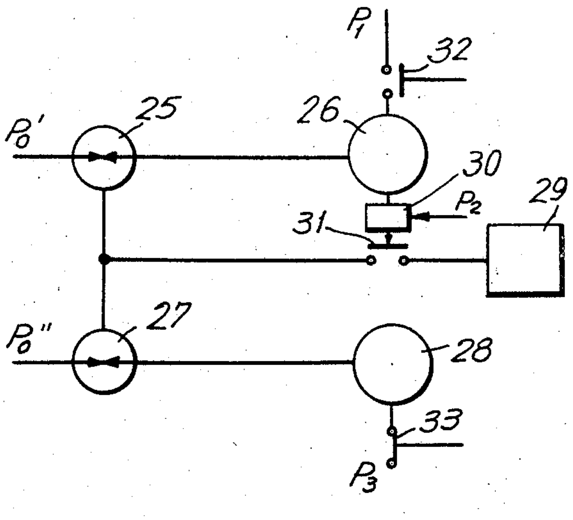
FIGURE 5 is a circuit diagram of a device performing discretely in time multiplying-dividing, exponential and logarithmic operations.

The present invention is employed in a device performing discretely in time multiply-dividing exponential and logarithmetic operations (FIG. 5).

The device has a limitation of $P_1 \geqq P_2$.

Prior to starting a successive working cycle of the device it is necessary by means of valves 32 and 33 to set up pressures $P_1$ and $P_3$ in the respective chambers 26 and 28. After the pressure $P_1$ has been established in the chamber 26 signal $P_t$ pulses from generator 29 start to enter the resistance-elements 25 and 27 through the valve 31.

In accordance with the Equation 15 the pressures $P_L$ and $P_a$, in respective chambers 26 and 28, will be determined from the following expressions:

$$P_L=P_0'+(P_1-P_0')e^{-i\frac{V_{1L}}{V_L}} \qquad (16)$$

$$P_\alpha=P_0''+(P_3-P_0'')e^{-i\frac{V_{1\alpha}}{V_\alpha}} \qquad (17)$$

where: *i*—number of pulses pased in the valves control signal;

$V_L$ and $V_a$—volumes of respective chambers 26 and 28.

$V_{1L}$ and $V_{1a}$—volumes of respective chambers in pulsating resistance-elements 25 and 27.

Since the passage of pulses from the generator stops when $P_L=P_2$ (amplifier 30 actuates and closes the valve 31), the number of passed pulses can be determined from the Equation 16 by substituting $P_L=P_2$, then $$\dot{L}=\log_\alpha \frac{P_2-P_0'}{P_1-P_0'} \qquad (18)$$

where $$\alpha=e^{-\frac{V_{1L}}{V_L}}$$

From Equations 17 and 18

$$P_\alpha=P_0''+(P_3-P_0'')e^{-\frac{V_{1\alpha}}{V_\alpha}\log_\alpha\frac{P_2-P_0'}{P_1-P_0'}}$$

By designating $$e^{-\frac{V_{1\alpha}}{V_\alpha}}=\alpha^c$$

there results $$P_\alpha P=_0''+(P_3-P_0'')\left(\frac{P_2-P_0'}{P_1-P_0'}\right)^c$$

where *c*—adjustable constant coefficient.

With count levels $P_0^{11}=P_0^1=0$ $$P_\alpha=P_3\left(\frac{P_2}{P_1}\right)^c$$

Thus, the present device can perform discretely in time combined multiplying-dividing operations with rising to a power and introducing count level of pressures as well as logarithmic (see Equation 18), exponential (see Equation 17) and their derivative operations.

Figure 6:
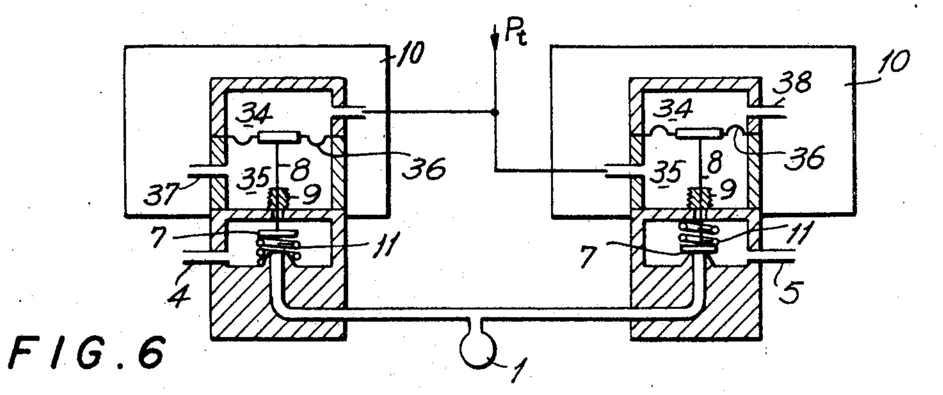
FIGURE 6 illustrates valve details for the above apparatus.

FIG. 6 shows the device of FIG. 1 provided with an exemplary embodiment of drives 10.

According to FIG. 6, every drive 10 comprises two chambers 34 and 35 respectively. The chambers are separated by diaphragm 36 which is rigidly conected to rod 8. The effective area of diaphragm 36 is many times greater than the same of gland 9, and therefore for the sake of simplicity, it is reasonable to neglect the forces due to the pressures applied to gland 9. Thus the state of the rod 8 and the valve (since shutter 7 is rigidly connected to rod 8) is determined by the forces due to pressures applied to diaphragm 36 and force of spring 11, namely every valve is open if the force directed upwards predominates and vice versa.

The control signal $P_t$ enters both chamber 34 of valve 2 and chamber 35 of valve 3 thus maintaining equal values $F_t$ of forces due to the pressure $P_t$ applied to diaphragms 36, the forces being oppositely directed. Both chamber 35 of valve 2 and chamber 34 of valve 3 have vents 37 and 38 respectively to atmosphere. The force of spring 11 of valve 2 counteracting the force $F_t$ is lesser than the force of spring 11 of valve 3 counteracting the force $F_t$ in valve 3.

From the moment when there is no pulse in the signal $P_t$ that is $P_t=0$ and the force $F_t$ due to the pressure $P_t$ is also equal to zero; the valve 2 is open since the force of spring 11 directed upwards predominates and valve 3 is closed as the force of its spring 11 directed downwards predominates.

When a pulse in the signal $P_t$ appears (i.e. the pressure $P_t$ is increasing during some time interval) the force due to the pressure $P_t$ first predominates over the force of the spring of valve 2 (the lesser force) and later predominates over the force of the spring of valve 3 thus causing the closure of valve 2 necessarily before the opening of valve 3. In other words, during the time interval after the moment at which the force due to the signal $P_t$ has already reached the value of the spring force of valve 2, and until it has reached the value of the spring force of valve 3, valve 2 is already closed while valve 3 is still closed, i.e. during the said time interval both valves are closed.

After the moment at which the valve 3 spring force has been predominated over by the force $F_t$, valve 2 is maintained closed and valve 3 is maintained open until the pulse in signal $P_t$ disappears.

When the pulse in the signal $P_t$ is disappearing, the force due to the pressure $P_t$ will become lesser than the valve 3 spring force $F_3$, and later lesser than the valve 2 spring force (since $F_2<F_3$), thus causing the closure of valve 3 before the opening of valve 2. In other words, during the time interval after the force $F_t$ has already reached the value of the valve 3 spring force and until the force $F_t$ has reached the value of the valve 2 spring force, valve 3 is already closed while valve 2 is still closed, i.e. during the said time interval both valves are closed.

After the moment at which the force $F_t$ has become lesser than valve 2 spring force, valve 3 is maintained closed and valve 2 is retained open until the pulse in signal $P_t$ appears and so on.

Therefore it is shown that during the time when there is no pulse in signal $P_t$, valve 2 is open and valve 3 is closed; during the time when the pulse is appearing both valves are closed; during the time when there is a pulse, valve 2 is closed and valve 3 is open; and during the time when the pulse is disappearing, both valves are closed; that is the valves are open exclusively in alternate order (in the same order chamber 1 is connected to the lines 4 and 5).

It is possible to have springs of equal force in both valves. In this case, pressure applied to vent 38 must be larger than the pressure applied to vent 37 in order to provide the valves with the necessary difference of the forces counteracting the forces $F_t$.

Figure 7:
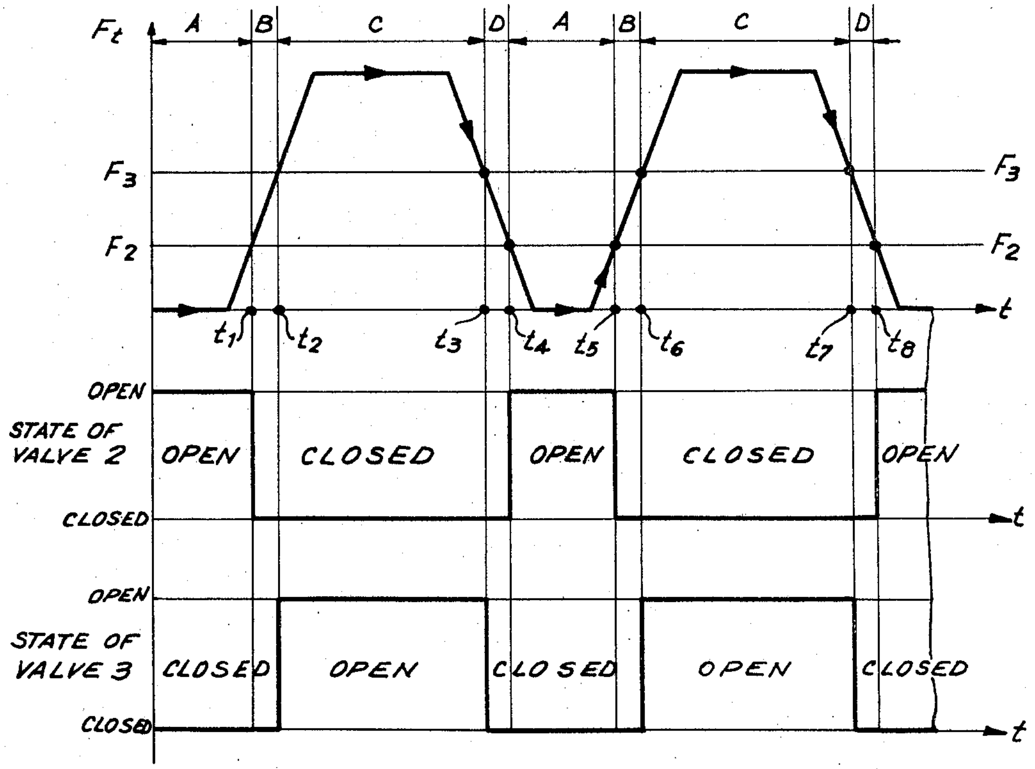
FIGURE 7 is a time charge illustrating valve operation.

FIG. 7 illustrates visually the above discussion of FIG. 6. In FIG. 7, three diagrams are given, namely: the force $F_t$ vs. time $t$, the state of the valve 2 vs. time $t$ and the state of the valve 3 vs. time $t$.

From FIG. 7 it is clear that in the interval A, before the moment $t_1$ at which the force $F_t$ reaches the value $F_2$ of the valve 2 spring force, valve 2 is open and valve 3 is closed. In the interval $B_1$ from $t_1$ till the moment $t_2$, at which value $F_3$ of the valve 3 spring force is reached, both valves are closed, Similarly, it is clear that in the interval C (from $t_2$ till $t_3$) since $F_t > F_2$ and $F_t > F_3$, valve 2 is closed and valve 3 is open, in the interval D (from $t_3$ till $t_4$), since $F_3 > F_t > F_2$, both valves are closed, and so on.

Figure 8:
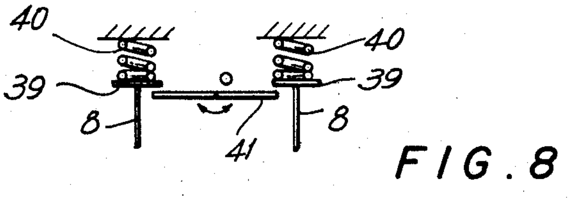
FIGURE 8 illustrates a detail of the valves.

In FIG. 8 is shown a mechanical embodiment for drives 10. Every drive 10 comprises a rod 39 rigidly connected to the rod 8 and a spring 40. The forces of the springs 40 are such that both rods 10 are in their lowermost position (that is, both valves are closed) if rod 41 is in its neutral position and does not touch any rod 39 (this situation is presented in FIG. 8). It is clear that if rod 41 is alternately pivoted at its center O, it will raise rods 8 exclusively in alternate order, thus causing opening of the valves in the same order.

It is evident that the drives must not necessarily be pneumatic or mechanical. They can be electrical or the like (if, for instance, rod 41 is pivoted by an electrical relay).

What is claimed is:

1. A device for transferring gas from one line to another in proportion to the difference of pressures in said lines, comprising a gas chamber, and means for alternately connecting said chamber to said lines one at a time such that during each connection a pressure is built up in the said chamber which is equal to the pressure in the connected line; said means including control means for closing communication between the chamber and both said lines in an interval between alternate connection of the chamber and said lines whereby both lines are never open simultaneously to said chamber, the volume of said chamber and the frequency of said connections being such that the amount of gas passed is proportional to the volume of said chamber and the number of connections effected between said chamber and said lines.

2. The combination of a plurality of devices as claimed in claim 1 comprising a common line connected to one line of each of said plurality of devices to form a common unit for producing a total pressure.

3. The combination as claimed in claim 2 comprising means connected to said common unit for controlling said control means to vary the frequency of the connections of each device.

4. A device as claimed in claim 1 comprising a second chamber connected to one of said lines for receiving a pressure which is an exponential function of the pressure in the other said line and the number of said alternate connections of the first chamber to said lines.

5. A device as claimed in claim 4 comprising means having an input connected to said second chamber and an output connected to said means which alternately connects the first chamber to said lines for starting and ceasing said connections.

6. A method of performing computations which comprises providing a plurality of elements each having a chamber and an input and output line, the input line being adapted to receive a gas under pressure, connecting said elements with one another by connection of said lines together, connecting each chamber alternately to its lines, regulating gas flow between the chambers in a sequence and at a frequency to provide an output signal corresponding to the computation to be performed, and controlling the connection of each chamber to its respective pair of lines and to the chambers interconnected therewith to provide an interval between the alternate connections of the lines in which both lines are simultaneously closed.

References Cited

UNITED STATES PATENTS 2,979,068 4/1961 Griswold et al. ------ 137—82

RICHARD B. WILKINSON, Primary Examiner

L. R. FRANKLIN, Assistant Examiner